No. 812,744. PATENTED FEB. 13, 1906.
F. G. HERTZIG.
POST HOLE AUGER.
APPLICATION FILED JULY 9, 1904.
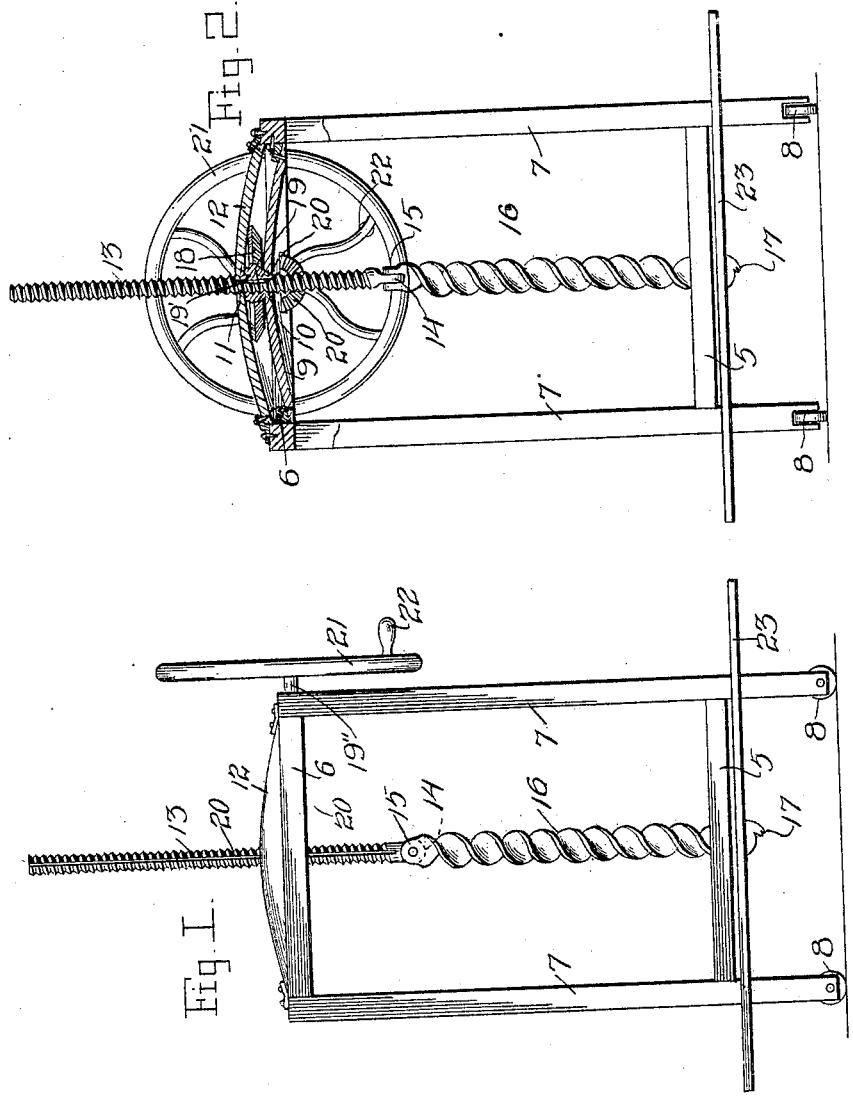

UNITED STATES PATENT OFFICE.

FRED GOTTLIEB HERTZIG, OF NEW PHILADELPHIA, OHIO.

POST-HOLE AUGER.

No. 812,744. Specification of Letters Patent. Patented Feb. 13, 1906.

Application filed July 9, 1904. Serial No. 215,941.

*To all whom it may concern:*

Be it known that I, FRED GOTTLIEB HERTZIG, a citizen of the United States, residing at New Philadelphia, in the county of Tuscarawas, State of Ohio, have invented certain new and useful Improvements in Post-Hole Augers; and I do hereby declare the following to be a full, clear, and exact description of the invention, such as will enable others skilled in the art to which it appertains to make and use the same.

This invention relates to post-hole augers; and it has for its object to provide a cheap and simple construction by means of which post-holes may be quickly dug and with a minimum expenditure of energy, a further object of the invention being to provide a construction which will be convenient to operate and which may be readily shifted from place to place, as may be desired.

In the drawings forming a portion of this specification, and in which like numerals of reference indicate similar parts in both views, Figure 1 is an elevation of a machine embodying the present invention. Fig. 2 is a view, partly in elevation and partly in vertical section, looking at right angles to Fig. 1.

Referring now to the drawings, there is shown an apparatus comprising a frame including the rectangular arrangement of sills 5 and a corresponding arrangement of beams 6 thereabove and connected with the sills by means of corner-posts 7, which latter extend below the sills, where they are provided with supporting-wheels 8. Transversely of the top of the frame is secured an arched plate 9, having a central threaded perforation 10, which alines with a corresponding perforation 11 in the plate 12, which is disposed directly above the plate 9. Through the threaded perforations 10 and 11 is engaged a screw 13, having a head 14 at its lower end within the inclosure of the frame and which head is pivoted between the sides of the bifurcated stem 15 of an auger 16, the cutting edges 17 of which are serrated, as illustrated. As the screw 13 is reversely rotated the auger 16 is raised and lowered and is at the same time rotated. To rotate the screw 13, and thereby feed it, a beveled gear-wheel 18 is provided having a central perforation 19, with which the screw 13 is engaged, the gear-wheel lying between the arches 9 and 12 and having a lug 19, which engages the longitudinal slot 20, formed in the screw. The hub of the gear-wheel bears with its ends against the arches and is held by them against vertical movement when the wheel is rotated to rotate the screw, as above described.

Upon the frame is mounted a shaft 19, having a beveled pinion 20 engaging the gear-wheel 18 and having at its outer end a flywheel 21, provided with a handle 22 for rotating it.

It will be seen that with the present construction there is provided an auger which may be simultaneously rotated and fed downwardly, and the pitch of the feed-screw is less than that of the auger, so that the latter takes up the earth gradually and jamming of the auger is prevented.

At the bottom of the frame and at each side thereof is formed a platform 23, upon which the operators may stand.

It will be understood that in practice modifications of the specific construction shown may be made and any suitable materials and proportions may be used for the various parts without departing from the spirit of the invention.

What is claimed is—

An earth-auger comprising a frame including uprights and connecting cross-pieces, vertically-spaced upwardly-arched plates mounted in the upper portion of the frame, said plates having alining threaded perforations through their central portions, a screw fitted in said perforations and extending above and below the plates and having a longitudinal groove, a bevel-gear having a central perforation in which the screw is slidably received, said gear being rotatable between and in contact with the spaced plates and having a lug slidably engaging the groove of the screw, an auger connected to the lower end of the screw, a second bevel-gear meshing with the first-named bevel-gear, and means for rotating the second bevel-gear in either direction, whereby the screw and bit may be raised or lowered.

In testimony whereof I affix my signature in presence of two witnesses.

FRED GOTTLIEB HERTZIG.

Witnesses:
W. I. KINSEY,
JOHN W. HILL.